US010056727B2

(12) United States Patent
Jesenko et al.

(10) Patent No.: US 10,056,727 B2
(45) Date of Patent: Aug. 21, 2018

(54) ROTOR OF A DYNAMOELECTRIC MACHINE

(71) Applicant: SIEVA D.O.O.-POSLOVNA ENOTA IDRIJA, Idrija (SI)

(72) Inventors: Silvo Jesenko, Godovic (SI); Klemen Petric, Idrija (SI); Ludvik Kumar, Logatec (SI)

(73) Assignee: SIEVA D.O.O.—POSLOVNA ENOTA IDRIJA, Idrija (SI)

( * ) Notice: Subject to any disclaimer, the term of this patent is extended or adjusted under 35 U.S.C. 154(b) by 266 days.

(21) Appl. No.: 14/873,964

(22) Filed: Oct. 2, 2015

(65) Prior Publication Data

US 2016/0028200 A1    Jan. 28, 2016

Related U.S. Application Data

(63) Continuation of application No. PCT/EP2014/000867, filed on Apr. 1, 2014.

(30) Foreign Application Priority Data

Apr. 4, 2013    (DE) .......................... 10 2013 005627

(51) Int. Cl.
*H01R 39/32*    (2006.01)
*H01R 4/62*    (2006.01)
(Continued)

(52) U.S. Cl.
CPC .............. *H01R 39/32* (2013.01); *H01R 4/62* (2013.01); *H01R 39/025* (2013.01); *H01R 39/04* (2013.01);
(Continued)

(58) Field of Classification Search
CPC . H02K 13/04; H02K 3/02; H01R 4/62; H01R 39/04; H01R 39/32; H01R 43/06
USPC ......................................... 310/233, 234, 235
See application file for complete search history.

(56) References Cited

U.S. PATENT DOCUMENTS 3,668,449 A    6/1972    King
3,996,660 A *    12/1976    Hancock ............... H01R 39/04
                                                        29/597
(Continued)

FOREIGN PATENT DOCUMENTS

DE            964257 C       5/1957
DE        25 38 295 A1      3/1977
(Continued)

OTHER PUBLICATIONS

International Preliminary Report on Patentability with the Written Opinion issued for corresponding International Application No. PCT/EP2014/000867 dated Oct. 6, 2015.

*Primary Examiner* — Hanh Nguyen
(74) *Attorney, Agent, or Firm* — Myers Wolin, LLC

(57) ABSTRACT

A rotor of a dynamoelectric machine is provided, the rotor comprising a shaft, an essentially cylindrical armature, an armature coil comprising aluminum coil wires and a drum commutator, which comprises an insulating support body and conductor segments which are attached to said support body and fixed therein by means of armature sections. Said conductor segments each comprise a copper running surface area and a connection area made of aluminum or a metal which can be soldered with aluminum (aluminum-compatible metal) having a soldering tag which greatly projects over the brush running surface. Said coil wires are soldered to the end side to the soldering tag of the respectively associated conductor segments and to be precise, without directly contacting the areas of the running surface.

7 Claims, 6 Drawing Sheets

(51) Int. Cl.
   *H01R 39/04*     (2006.01)
   *H01R 43/06*     (2006.01)
   *H02K 13/04*     (2006.01)
   *H01R 39/02*     (2006.01)
   *H02K 3/02*      (2006.01)
(52) U.S. Cl.
   CPC ............ *H01R 43/06* (2013.01); *H02K 13/04* (2013.01); *H02K 3/02* (2013.01); *H02K 2213/03* (2013.01)

(56) References Cited

U.S. PATENT DOCUMENTS

| | | | |
|---|---|---|---|
| 4,933,587 A | | 6/1990 | Tanaka et al. |
| 5,208,502 A | * | 5/1993 | Yamashita ............ H01R 39/022 310/219 |
| 2010/0072851 A1 | * | 3/2010 | Qin .................... H02K 3/02 310/158 |

FOREIGN PATENT DOCUMENTS

| | | |
|---|---|---|
| DE | 102010064230 A1 | 6/2012 |
| EP | 805733 B1 | 11/1997 |
| EP | 2090395 A2 | 8/2009 |
| FR | 2 225 854 A1 | 11/1974 |
| FR | 2 458 930 A1 | 1/1981 |
| GB | 1 418 197 A | 12/1975 |
| GB | 1 552 165 A | 9/1979 |
| JP | 06253507 A | 9/1994 |
| WO | 88/06356 A1 | 8/1988 |

* cited by examiner

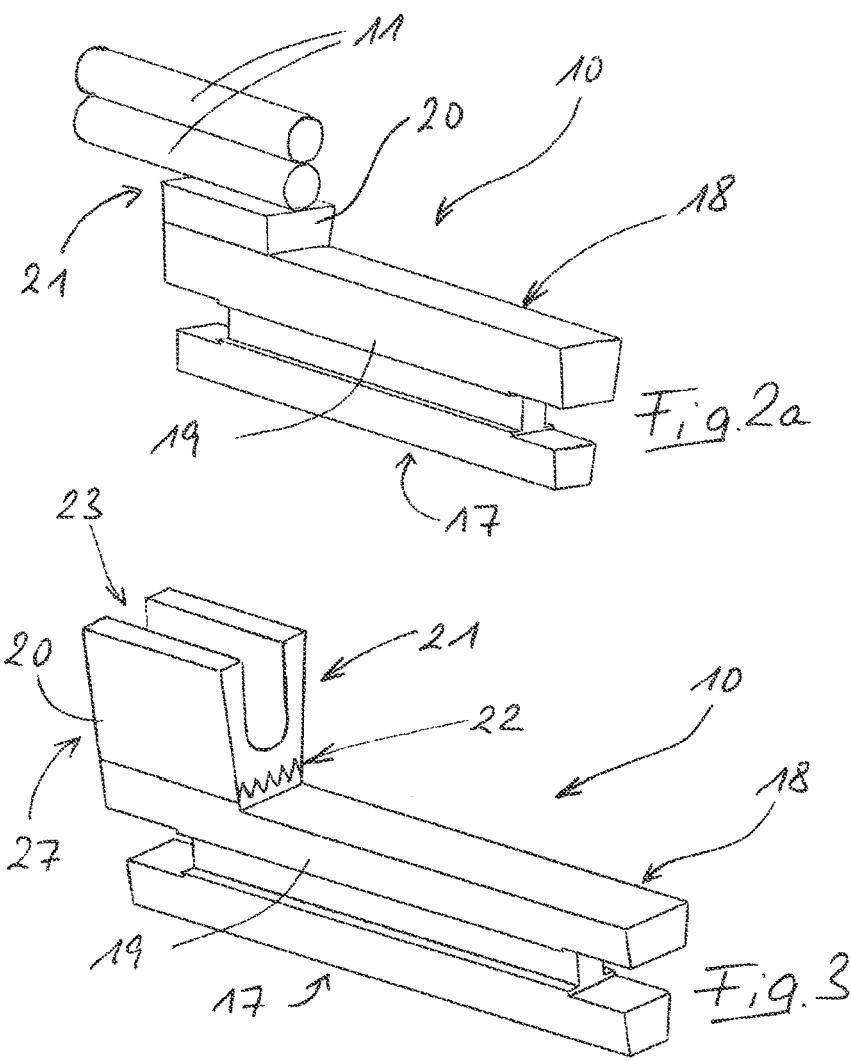
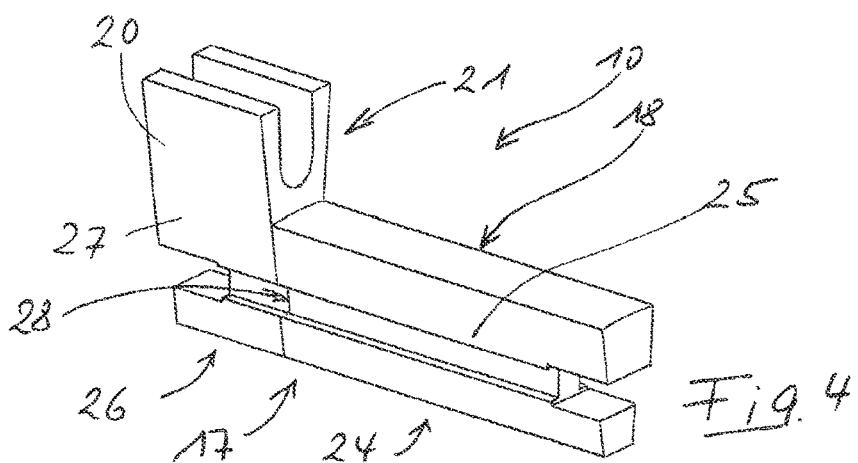

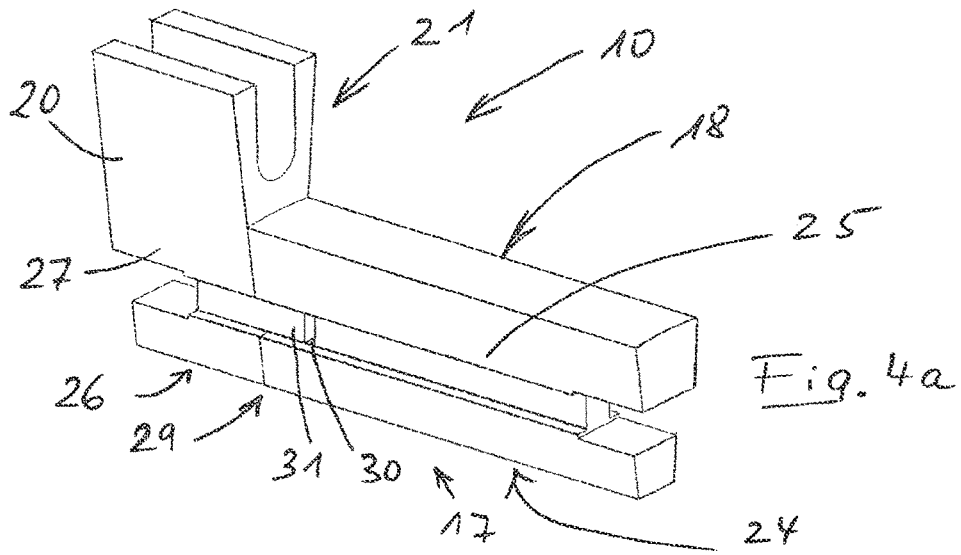
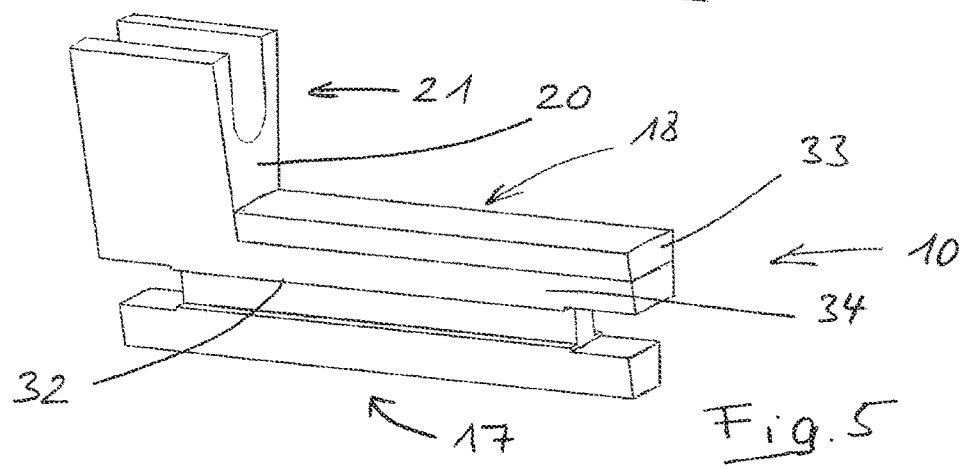
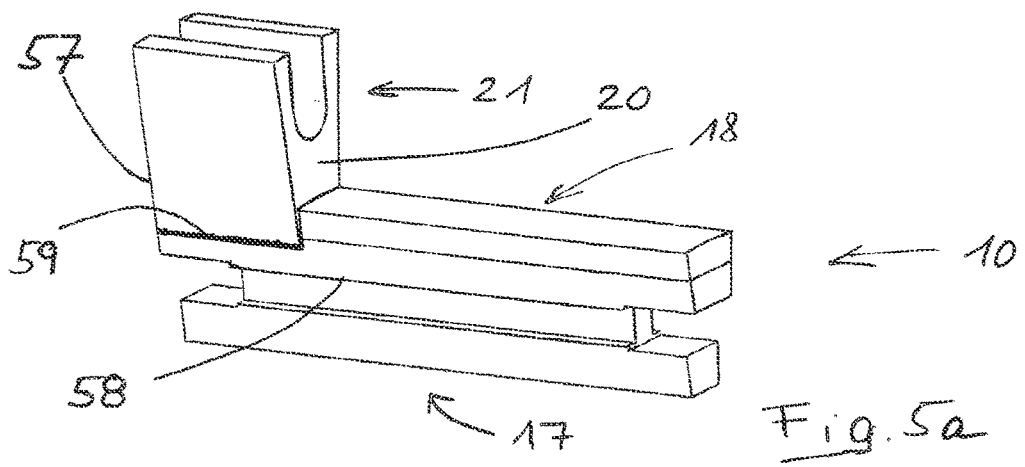

Fig. 9
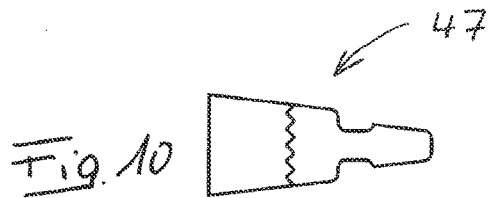
Fig. 10
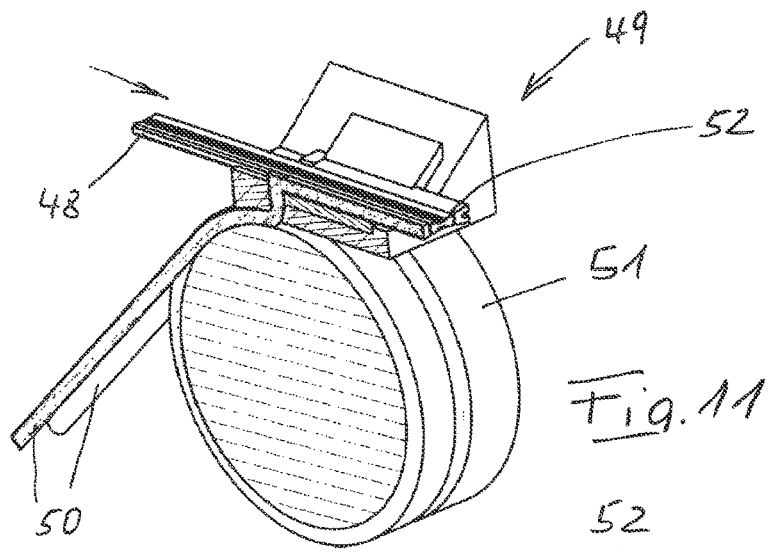
Fig. 11
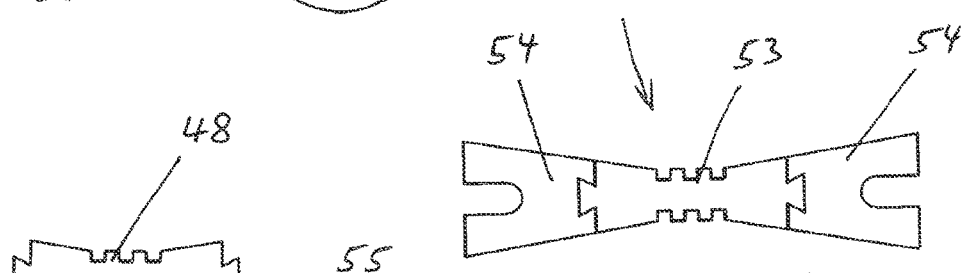
Fig. 12
Fig. 13
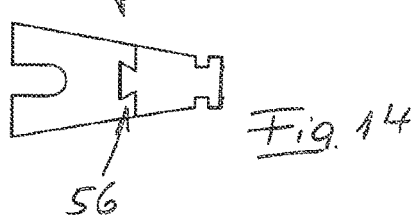
Fig. 14

ROTOR OF A DYNAMOELECTRIC MACHINE

CROSS REFERENCE TO RELATED APPLICATIONS

This application is a continuation under 35 U.S.C. § 120 of International Application PCT/EP2014/000867, filed Apr. 1, 2014, which claims priority to German Application 10 2013 005 627.6, filed Apr. 4, 2013, the contents of each of which are incorporated by reference herein.

FIELD OF THE INVENTION

The present invention relates to a rotor of a dynamoelectric machine with a shaft, a substantially cylindrical armature, an armature winding and a drum commutator, which comprises an insulating support member and conductor segments, which are attached thereto and anchored in the support member by means of armature portions, and to which the winding wires are attached in electrically conducting relationship. The present invention also relates to aspects of the production of drum commutators used in such rotors.

BACKGROUND

Rotors of dynamoelectric machines, especially of electric motors, are subjected in practice to a large number of requirements, some of which are in conflict with one another. The most important of such requirements applicable to rotors of the type mentioned in the introduction or to the dynamoelectric machines equipped therewith are high efficiency, high power, compact construction, reliability and longevity, low time and effort for maintenance, low producing costs, light weight and low mass moments of inertia. These requirements apply in particular for electric starters of internal combustion engines, wherein new challenges, particularly with regard to the life expectancy of the starter in question, have transpired because of the intensified use of start/stop functions of the motor vehicles equipped with such internal combustion engines.

The object of the present invention is to provide a rotor mentioned in the introduction that in the sense of a particularly practical compromise with regard to the requirements relevant to practice explained in the foregoing is characterized by particularly high practicality, especially also with regard to the use thereof in starters of internal combustion engines.

SUMMARY

This stated object is achieved according to the present invention by a rotor of the type mentioned in the introduction, which is characterized by the following features, which are matched to one another and functionally related to one another in the sense of a synergetic interaction:
  the winding wires consist of aluminum;
  the conductor segments respectively have a running-surface region consisting of copper and a terminal region consisting of aluminum or a metal that can be welded to aluminum (aluminum-compatible metal);
  the terminal region comprises respectively a massive terminal lug, which projects radially relative to the brush running surface;
  the winding wires are welded at the end to the terminal lug of the respectively associated conductor segment, without being in direct contact with the running-surface regions.

Certainly the definitive electrical properties of aluminum, i.e. especially the conductivity, are significantly poorer than those of copper, which in practice has been used regularly heretofore for the winding wires of the armature winding of rotors of dynamoelectric machines. Consequently, aluminum winding wires approximately 25% thicker than winding wires of copper are needed for comparable performances of the machine, i.e. the conduction of equivalent currents through the rotor winding, thus leading to an approximately 65% larger volume of the winding in the case of use of aluminum instead of copper. Nevertheless, taking the density of the respective material as well as the typical material price into consideration, a quite considerable cost advantage compared with the use of copper is achieved in the case of use of aluminum for the production of the winding wires; and also the weight of the rotor winding can be significantly reduced (to approximately 50% of the weight of the rotor winding of copper). This is a quite considerable advantage precisely in rotors for starters of modern motor vehicles, because the moment of inertia of the rotor of the starter is correspondingly reduced, thus leading to increased acceleration of the rotor during starting of the internal combustion engine. Accordingly, the time of rotation of the rotor of the starter is shortened in the respective starting cycle, which in turn has a positive influence on brush wear and on commutator wear and prolongs the life expectancy of the system, which has become a problem in the application of conventional engineering in motor vehicles with start/stop function. At the same time, the inventive construction of the drum commutator also has an influence of the life expectancy of the system, accompanied simultaneously by high efficiency of the rotor. This is so because, by application of established, particularly reliable welding techniques, the region of the connection of the winding wires to the conductor segments of the drum commutator, which according to the invention is particularly sensitive, can be formed with good electrical conductivity and mechanically durable strength by virtue of the fact that the conductor segments consisting of aluminum-compatible metal comprise terminal regions with respectively a massive terminal lug projecting radially relative to the brush running surface. Conversely, the performance of the drum commutator does not suffer from the tendency of aluminum to form nonconductive oxides, since the conductor segments of the drum commutator respectively comprise a running-surface region consisting of copper. The joint, achieved in the scope of the present invention (i.e. the running-surface regions of the conductor segments consisting of copper or the copper structures comprising the running-surface regions), of copper to aluminum (i.e. the terminal regions of the conductor segments consisting of aluminum-compatible metal and having a massive terminal plate or the aluminum structures comprising the terminal regions) is preferably made inside the drum commutator in this case, so that the joint is accessible to only a limited extent or even not at all for electrolytes, which could cause degradation of the joint because of differences in electric potentials. In the present sense, the joint of copper and aluminum is therefore preferably embedded completely in the support member. The thickness of the running-surface region consisting of copper typically amounts to at least 2 mm in this case. Depending on the individual construction (see below), however, even considerably larger thicknesses may be advantageously achieved.

The concept of producing the rotor winding of a dynamo-electric machine from aluminum has already been addressed thematically in U.S. Pat. No. 3,668,449 A. However, no rotor satisfying the requirements explained hereinabove can be produced by applying the information from that document since, for the purpose of being able to connect a rotor winding consisting of aluminum to the conductor segments, the commutator is produced from a two-layer sheet, which consists of copper and aluminum and is rolled to cylindrical form with its aluminum layer facing outward. The cylinder of two-layer sheet produced in this way is then mounted on a core and subdivided into individual segments by cuts. Then the aluminum layer is machined off in the region of the cylinder of two-layer sheet destined for later contact with brushes. At the terminal lugs, however, the sheet continues to have two layers. The terminal lugs are bent to eyes with the aluminum layer on the inside and the copper layer, which is necessary for the strength of the terminal lug bent to an eye, on the outside. The rotor winding is passed through the respective eye. Despite the quite considerable production-engineering complexity, the commutator is ultimately in no way fit for applications with the high power requirements typical at present.

To simplify the vocabulary, the term "aluminum" (instead of "aluminum-compatible metal") will be used on occasion hereinafter with reference to the material of the conductor segments. This is not to be construed as any restriction to (pure) aluminum; to the contrary, "aluminum" in such cases is to be understood as "aluminum-compatible material", with the meaning that the material can be welded to winding wires of a rotor winding that consist of aluminum.

According to a first preferred improvement of the present invention, the terminal regions of the conductor segments of the drum commutator respectively have at least one recess for receiving the end of at least one winding wire, for example in the form of a slot, notch or perforation, which preferably extends parallel to the commutator axis. This—in view of application of welding techniques appropriate for the purpose—is advantageous with regard to the longevity of the rotor by virtue of a connection of the rotor winding with the commutator that is durably particularly reliable. For application of other welding techniques, however, it is favorable when the end of at least one winding wire is welded directly to the radial outer face—which is not provided with any recess or the like—of the terminal lug.

Another preferred improvement of the invention, which can be realized with process steps that are particularly simple to master, is characterized in that the armature portions of the conductor segments consist completely of copper and are respectively part of a uniform copper structure that also comprises the respective associated running-surface region. In this case a terminal sub-segment comprising the respective terminal region of the conductor segment in question and consisting of aluminum-compatible material is mounted on the outside of the respective associated copper structure, particularly preferably in radial relationship. For this purpose, the respective terminal sub-segment can be butt-welded (radially or axially) onto the copper structure. This is possible, for example, by applying a welding technique according to the capacitor discharge welding process (so-called capacitor discharge welding). The advantage of this technique consists in the only minimum heat development, so that the heat input into the running-surface region consisting of copper is so small that recrystallization of the copper—which could impair the hardness and thus the useful life—does not occur there. In this sense a preferred improvement of the invention is characterized in that the hardness (Brinell) of the running-surface regions of the conductor segments of the finished drum commutator, especially in the case of application of a welding technique for joining the components of the conductor segments consisting of different material, is at least 90 HB and advantageously meets a tolerance of 5 HB. By comparison, in the case of application of other joining techniques (e.g. adhesive bonding and cold-welding techniques such as ultrasonic welding, friction welding and the like), it is particularly preferable but not imperative for the terminal sub-segment and the copper structure respectively engage with one another in the region of a serrated joint zone.

For commutators usable within the scope of the present invention, wherein the armature portions of the conductor segments consist completely of copper and are part of a uniform copper structure, the conductor segments can also be stamped out of a strand-like two-component profile, which was formed by durably joining a copper sub-profile (extruded profile) and an aluminum sub-profile (extruded profile). In this case the copper sub-profile and the aluminum sub-profile are preferably rolled together continuously under high pressure (between at least two rolls), wherein on the one hand the copper sub-profile is preheated (especially by means of inductive heating) before being joined to the aluminum sub-profile and on the other hand a laser beam is directed straight into the joint zone between the two sub-profiles. In this way a joint particularly capable of withstanding mechanical and electrical loads is obtained between the aluminum sub-profile and the copper sub-profile with relatively low production-engineering complexity. The aluminum sub-profile is preferably then stamped down in the region of the later running-surface regions so far that the copper sub-profile is exposed there. Thus this improvement is possible with a continuously operating joining technique, in order to join the copper component and the aluminum component to one another, and in fact, preferably before the conductor segments are stamped out of the two-component extruded profile in question.

According to another preferred improvement of the invention, the armature portions consist only partly of copper, because of the fact that respectively a first region of the armature portion is part of a uniform copper structure that also comprises the respective associated running-surface region and a second region of the armature portion is part of a uniform terminal sub-segment of aluminum-compatible metal that also comprises the respective associated terminal region. In this way, therefore, the terminal sub-segments comprising the terminal regions are automatically anchored—via the associated armature portion regions—in the support member, thus being able to contribute to relieving the joint between copper and aluminum mechanically. Particularly preferably, the copper structure and the terminal sub-segment can then be butt-welded to one another in the region of an axial end face of the copper structure. Here also, preferably such welding techniques that result in relatively low heat development, such as in particular capacitor discharge welding (capacitor discharge welding) are again used in the sense of the foregoing explanations. Instead of butt-welding of the copper structure and the terminal sub-segment in the region of an axial end face of the copper structure, it is possible, specifically when friction or ultrasonic welding in particular is intended, to provide, in the region of the joint between copper structure and terminal sub-segment, interlocking engagement zones, especially with projections oriented parallel to the commutator axis and corresponding incisions. This has a positive effect both with regard to statics and with regard to electrical conductivity under long-term conditions, since the contact face through which current flows at the transition from the terminal sub-segments to the copper structures can be made significantly larger by the said interlocking engagement zones.

According to yet another preferred improvement of the invention, the armature portions consist completely of aluminum-compatible metal. In particular, these may each be completely part of a uniform basic structure of aluminum-compatible metal, which also comprises the respective associated terminal region and on which a copper plating comprising the running-surface portion is applied. The aspects explained hereinabove are valid for the joining of the copper plating with the basic structure of aluminum-compatible metal, both with regard to the forming of the transition region (as a butt joint or profile) and with regard to possible joining techniques (adhesive bonding, welding and the like). As regards several of the initially mentioned viewpoints (weight, material costs), this improvement, in which aluminum (or aluminum-compatible metal) is used to the greatest possible extent to produce the conductor segments, is particularly favorable.

For commutators usable within the scope of the present invention, in which the armature portions of the conductor segments—in the sense of the foregoing explanation—consist completely of aluminum-compatible metal, conductor-segment blanks may also be stamped out of a strand-like two-component profile, which is obtained by durable joining of a copper sub-profile (extruded profile) and an aluminum sub-profile (extruded profile). In this case the copper sub-profile and the aluminum sub-profile are preferably rolled together according to the procedure of EP 805733 B1 or EP 2090395 A2—continuously under high pressure (between at leas two rolls), wherein on the one hand the copper sub-profile is preheated (especially by means of inductive heating) before being joined to the aluminum sub-profile and on the other hand a laser beam is directed straight into the joint zone between the two sub-profiles. In this way a joint particularly capable of withstanding mechanical and electrical loads is obtained between the aluminum sub-profile and the copper sub-profile with relatively low production-engineering complexity. During—or if necessary in a second step after—the stamping out of the conductor-segment blanks from the strand-like two-component profile, preferably the copper sub-profile is stamped down so far where a separate aluminum structure comprising the terminal region will be attached later that the aluminum sub-profile is exposed there. A separate aluminum structure comprising the terminal region is then welded onto the exposed aluminum sub-profile, for example by means of laser welding.

According to yet another improvement, which is particularly attractive in terms of process engineering, the conductor segments are respectively joined together from two prefabricated sub-segments, by the fact that, onto the end face of a first sub-segment comprising the running-surface portion and a first sub-armature portion there is welded a second sub-segment comprising the terminal region and a second sub-armature portion. Particularly preferably, this respective first sub-segment comprises a base consisting of aluminum-compatible metal engaging in the region of a serrated joint zone and a copper plating comprising the running-surface portion. In this improvement, the respective drum commutator can be produced with the least possible waste.

Another particularly attractive option for producing the conductor segments of the drum commutator used in the scope of the invention consists in the fact that these respectively contain a two-component extrusion profile with a transition zone, typically parallel to the commutator axis, between copper and aluminum-compatible metal. Accordingly, in this improvement, prefabricated formed parts are not joined together to produce the respective conductor segment. Instead, a two-component extrusion profile is processed for the production of the conductor segments. A first improvement, quite particularly preferred in this respect, is characterized in that the two-component extrusion profile is a co-extrusion profile, which is produced by simultaneous extrusion of copper and aluminum-compatible metal through a common forming nozzle. This is possible by application of the so-called "Conform" process using the machines designed for the purpose. According to another particularly preferred improvement, aluminum-compatible metal is extruded onto a prefabricated copper basic profile in order to produce the two-component extrusion profile. Machines set up for the application of the so-called "Conclad" process are suitable in particular for this purpose. After extrusion of the aluminum-compatible metal, the transition zone between the aluminum-compatible metal and the copper basic profile can then be subjected to mechanical post-processing, in order to optimize the quality of the joint. Press processes that involve some milling of the material are particularly worthy of mention here.

In all extrusion processes, mentioned in the foregoing, suitable for the production of two-component extrusion profiles, it is possible, according to yet another advanced preferred improvement of the invention, to produce the respective two-component extrusion profile by halving a symmetric three-zone extrusion profile. Thus, for example, the three-zone extrusion profile, which has been produced by application of the Conform process or else the Conclad process, can comprise a central region of copper and two outer regions of aluminum-compatible metal, wherein the copper region is subsequently split to obtain two two-component extrusion profiles. By virtue of the symmetric conditions during extrusion in this case, it is possible to maintain particularly high quality standards with good reproducibility in this case.

BRIEF DESCRIPTION OF THE DRAWINGS

The present invention will be explained in more detail hereinafter on the basis of several preferred exemplary embodiments illustrated in the drawing, wherein FIG. 2a shows a modification of the lamella illustrated in FIG. 2, FIG. 3 shows, in a perspective view, a second embodiment of the lamellas of the drum commutator used in the rotor according to FIG. 1, FIG. 4 shows, in a perspective view, a third embodiment of the lamellas of the drum commutator used in the rotor according to FIG. 1, FIG. 4a shows a modification of the lamella illustrated in FIG. 4, FIG. 5 shows, in a perspective view, a fourth embodiment of the lamellas of the drum commutator used in the rotor according to FIG. 1, FIG. 5a shows a modification of the lamella illustrated in FIG. 5, FIG. 9 shows a horizontal section through the extrusion nozzle used according to FIG. 7, FIG. 10 shows a cross section through a lamella basic profile produced by application of the Conform process illustrated in FIG. 7, FIG. 11 shows the production, achieved by application of the Conclad process, of a basic profile configured as a two-component, three-zone extrusion profile, which after being halved is intended for further processing as a drum-commutator lamella, FIG. 12 shows the copper basic profile used in the process according to FIG. 11 in sectional view, FIG. 13 shows, in cross section, the two-component, three-zone extrusion profile produced by application of the process according to FIG. 12 and FIG. 14 shows a cross section through the lamella basic profile produced by means of halving the two-component, three-zone extrusion profile according to FIG. 13

DETAILED DESCRIPTION OF THE PREFERRED EMBODIMENTS

Figure 1:
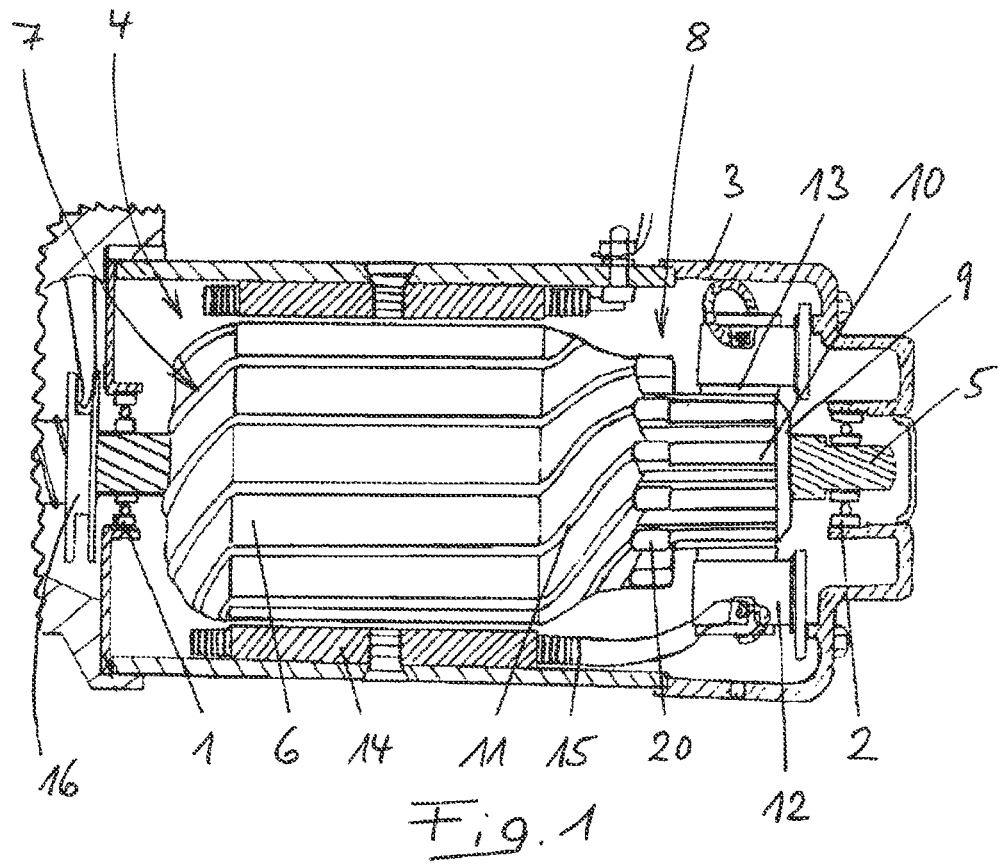
FIG. 1 shows, in a cutaway drawing suitable for understanding the present invention, a starter equipped with an inventive rotor

According to FIG. 1, rotor 4 mounted by means of two bearings 1, 2 in a starter housing 3 comprises a shaft 5, a substantially cylindrical armature 6, an armature winding 7 and a drum commutator 8. Drum commutator 8 has an insulating support member 9 and conductor segments 10 attached thereto and anchored by means of armature portions in the support member. Winding wires 11 of armature winding 7 are connected thereto in electrically conducting relationship. Also visible in FIG. 1 are further components of the starter, albeit not definitive in the present case, such as, in particular, brush holder 12 with brushes 13, pole shoe 14 with stator winding 15 and sliding sleeve 16 for engagement of the starter pinion into the toothed gear of the flywheel of the internal combustion engine in question.

In the scope explained in the present case, the starter illustrated in FIG. 1 corresponds to the standard, sufficiently known prior art, and so no further explanations are needed for understanding.

In implementation of the present invention, winding wires 11 of rotor 4 consist of aluminum. Conductor segments 10 of drum commutator 8 are configured in multi-component construction. They respectively have a running-surface region 18 consisting of copper and a terminal region 21 consisting of aluminum, wherein terminal region 21 consisting of aluminum respectively comprises a massive terminal lug 20 projecting radially relative to the brush running surface. At the ends, winding wires 11 are welded to terminal lug 20 of the respective associated conductor segment 10, without direct contact to brush running regions 18 (which consist of copper).

Figure 2:
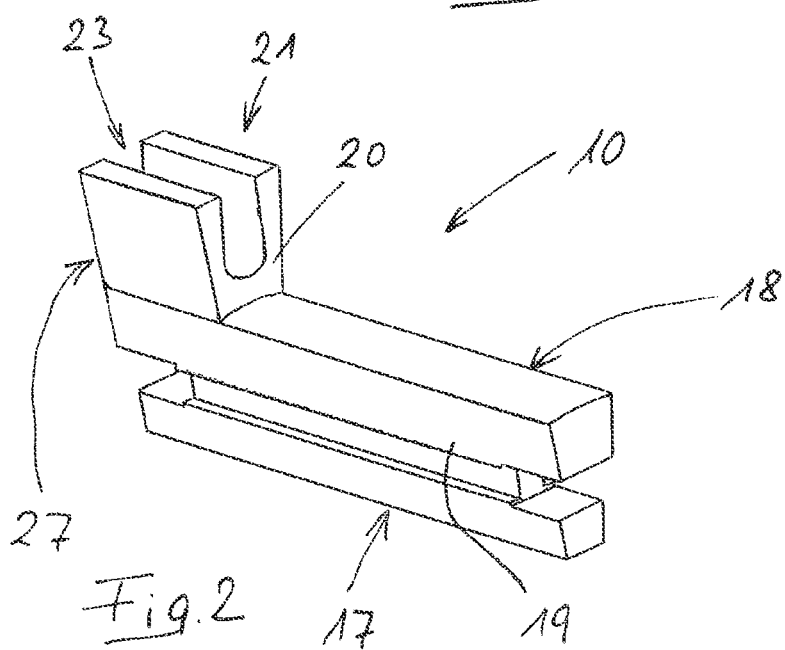
FIG. 2 shows, in a perspective view, a first embodiment of the lamellas (conductor segments) of the drum commutator used in the rotor according to FIG. 1.

In the exemplary embodiments shown in FIGS. 2 and 3, (undercut) armature portions 17 of conductor segments 10 of the drum commutator respectively consist of copper. They are respectively part of a uniform copper structure 19 that also comprises the respective associated running-surface region 18. A terminal sub-segment 27 respectively comprising massive terminal lug 20 of the conductor segment in question and consisting of aluminum is attached radially to the outside of the respective associated copper structure 19. According to FIG. 2, this terminal sub-segment 27 is butt-welded to copper structure 19, and specifically by application of capacitor discharge welding. In contrast, in the exemplary embodiment according to FIG. 3, in which terminal sub-segment 27 and copper structure 19 are joined to one another via, for example, an ultrasonic weld, terminal sub-segment 27 and copper structure 19 engage with one another in the region of a serrated joint zone 22. Two other techniques, which are suitable for the production of a strand-like basic profile from which conductor segments 10 can be produced by stamping out, substantially according to FIGS. 2 and 3, will be discussed in detail hereinafter—in connection with FIGS. 7 to 15. In both practical examples according to FIGS. 2 and 3, the massive terminal lug respectively has a slot-like recess 23 for receiving the ends of two winding wires 11. This is in no case indispensable, however, since, as illustrated in FIG. 2a, the two ends of winding wires 11 can be welded to massive terminal lug 20 even without such a recess.

In the exemplary embodiment according to FIG. 4, armature portion 17 of lamella 10, in contrast to the exemplary embodiments explained in the foregoing, consists only partly of copper and otherwise, however, of aluminum. In this lamella, therefore, a first region 24 of armature portion 17 is part of a uniform copper structure 25 comprising the respective associated running-surface region 18, and a second region 26 of armature portion 17 is part of a uniform terminal sub-segment 27 of aluminum, which also comprises the respective associated terminal region 21 with massive terminal lug 20. In this case copper structure 25 and terminal sub-segment 27 are butt-welded to one another in the region of an axial end face 28 of copper structure 25, and specifically by application of capacitor discharge welding. In contrast, in the modified embodiment according to FIG. 4a, an interlocking engagement zone 29 is provided in the region of the transition from terminal sub-segment 27 to copper structure 25. This comprises a projection 31 engaging in a corresponding recess 30, provided on terminal sub-segment 27, of copper structure 25, whereby the contact face between terminal sub-segment 27 and copper structure 25 is correspondingly enlarged and the contact face otherwise also has portions with orientation in circumferential direction. This configuration is suitable especially for cold welding of terminal sub-segment 27 and copper structure 25 by means of ultrasonic welding or friction welding. In a further modification, a serrated joint zone analogous to that of FIG. 3 would also be conceivable, for example in such joining techniques.

Figure 6:
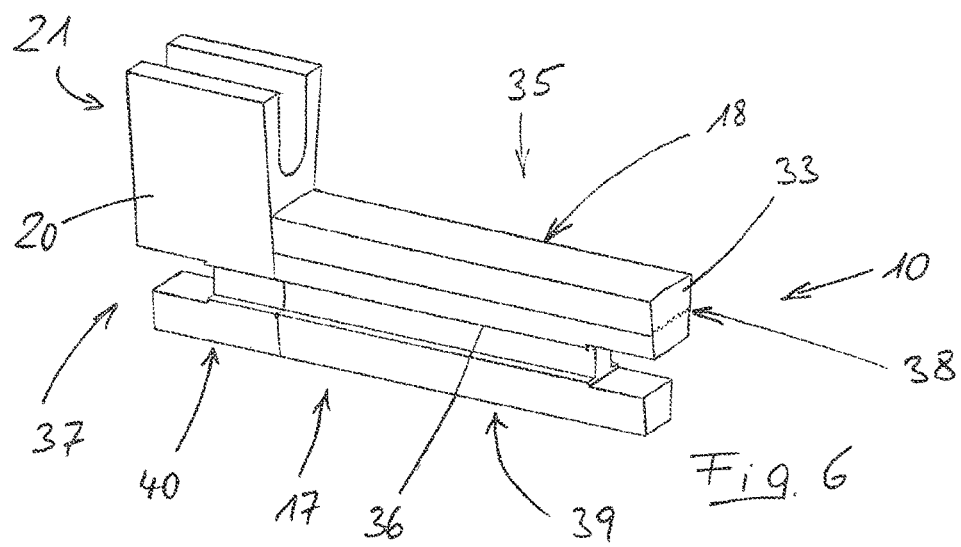
FIG. 6 shows, in a perspective view, a fifth embodiment of the lamellas of the drum commutator used in the rotor according to FIG. 1. Furthermore.

In the exemplary embodiments according to FIGS. 5, 5a and 6, armature portions 17, in contrast to the embodiments explained in the foregoing, consist completely of aluminum. Thus, in lamella 10 according to FIG. 5, armature portion 17 is completely part of a uniform basic structure 32 of aluminum, which also comprises the respective associated terminal region 21 with massive terminal lug 20. A copper plating 33 comprising running-surface portion 18 is applied on basic structure 32 of aluminum, for which purpose basic structure 32 of aluminum has a support web 34. Examples of suitable techniques for joining copper plating 33 to basic structure 32 of aluminum, i.e. support web 34 thereof, include cold-welding techniques known as such, capacitor discharge techniques as well as adhesive bonding techniques using electrically conductive adhesives.

FIG. 5a illustrates a modification of the embodiment according to FIG. 5. And here, in fact, terminal region 21 with massive terminal lug 20 is not part of a uniform basic structure that also comprises the armature portion. To the contrary, in order to form terminal region 21, a separate aluminum structure 57 comprising terminal lug 20 is welded—for example by means of laser welding—onto a conductor-segment blank 58. Conductor-segment blank 58 in turn had been stamped out of a strand-like two-component profile, which was obtained by durably joining a copper sub-profile (extruded profile) and an aluminum sub-profile (extruded profile) (see the explanation hereinafter about FIGS. 7 to 15), wherein, during—or if necessary in a second step after—the stamping out of conductor-segment blank 58 from the strand-like two-component profile, the copper sub-profile is stamped down so far where separate aluminum structure 57 comprising terminal lug 20 will be subsequently attached that the aluminum sub-profile is exposed there, and so aluminum structure 57 comprising massive terminal lug 20 can be welded to conductor-segment blank 58 there (see Al-to-Al welded joint 59).

In contrast, for conductor segment 10 shown in FIG. 6, a prefabricated first sub-segment 35, which comprises a base 36 consisting of aluminum and a copper plating 33 applied thereon and comprising running-surface portion 18, is joined together at the end face with a prefabricated second sub-segment 37, which consists of aluminum and comprises terminal region 21 with massive terminal lug 20. In this case, copper plating 33 and base 36 of first sub-segment 35 engage with one another in the region of a serrated joint zone 38. A process that is particularly suitable for the production of first sub-segment 35 will be discussed in detail hereinafter. Both sub-segments 35 and 37 of the conductor segment are anchored independently of one another in support member 9 of drum commutator 8, by the fact that first sub-segment 35 comprises a first sub-armature portion 39 and second sub-segment 37 a second sub-armature portion 40. In this case joining of the two sub-segments 35 and 37 is again accomplished, in order to protect running-surface portion 18 consisting of copper from recrystallization, by application of a capacitor discharge welding process.

In a preferred improvement of the present invention, structures of conductor segments 10 consisting of two materials permanently joined to one another in regions, i.e. in the present case of copper on the one hand and of aluminum-compatible metal on the other hand, as is the case in particular for conductor segment 10 according to FIG. 3 and first sub-segment 35 of conductor segment 10 according to FIG. 6, can be produced as a two-component extruded profile with suitable orientation of the transition zone (i.e. substantially parallel to the commutator axis), as is illustrated—in two different process variants—in FIGS. 7 to 14. According to FIG. 7, it is possible for this purpose in particular to apply—and specifically using "multi-groove" machines—the so-called "Conform" process, which will be explained hereinafter with reference to the production of a basic profile that is suitable for further processing to conductor segment 10 shown in FIG. 3. Copper in the form of a copper strand 44 is fed via a first circumferential groove 41 of feed wheel 42 is fed to extrusion nozzle 43, as is aluminum in the form of an aluminum strand 46 via a second circumferential groove 45. This extrusion nozzle 43 is configured, especially by appropriate construction of the extrusion channels for the two materials, in such a way that the forming of copper and aluminum takes place in slightly spaced-apart manner. In this way the copper acquires its cross-sectional shape (including the serrated joint surface) existing in the finished two-component extrusion profile (see FIG. 10) in a first nozzle portion 43a. In a second, downstream nozzle portion 43b, the aluminum is formed by extrusion onto the extruded copper. Thus the copper already beginning to solidify bounds the extrusion channel through which the aluminum is flowing, thus leading to an intensive, intimate, durably hard-wearing, interlocking joint of aluminum and copper with one another. By application of the process according to FIG. 7, the two-component extrusion profile (FIG. 10), which represents a lamella basic profile 47 for further processing to lamella 10 according to FIG. 3, is produced as a coextrusion profile by simultaneous extrusion of copper and aluminum through a common nozzle system.

In a manner analogous to the two-component extrusion profile according to FIG. 10, differently configured copper/aluminum two-component extrusion profiles for conductor segments of drum commutators used in inventive rotors can be produced, such as in particular a basic profile, which can be further processed to first sub-profile 35 of conductor segment 10 according to FIG. 6.

FIG. 11 illustrate the application of the "Conclad" process for producing a different copper/aluminum two-component extrusion profile 55 (see FIG. 14), which (as a lamella basic profile) can be used in the course of production of a drum-commutator conductor segment of an inventive rotor. And, specifically in this case, aluminum is extruded onto a preformed copper basic profile 48 (see FIG. 12), which is passed without noteworthy deformation through extrusion nozzle 49. By virtue of the feeding of two aluminum strands 50 by means of a two-groove feed wheel 51 and appropriate construction of extrusion nozzle 49, symmetric double extrusion of aluminum onto copper basic profile 48 is achieved, whereby a symmetric three-zone extrusion profile 52 (see FIG. 13) with a copper core zone 53 and two aluminum outer zones 54 is obtained. By halving, two two-component extrusion profiles 55 (FIG. 14) are produced from three-zone extrusion profile 52. During application of the Conclad process, it is expedient when the copper region and the aluminum region respectively are additionally joined interlockingly to one another by a dovetail-like undercut 56. In addition, the extrusion of the aluminum onto copper basic profile 48 can be followed by mechanical post-processing of the transition zones, in order to optimize the mechanical and electrical quality of the transition zones.

Figure 7:
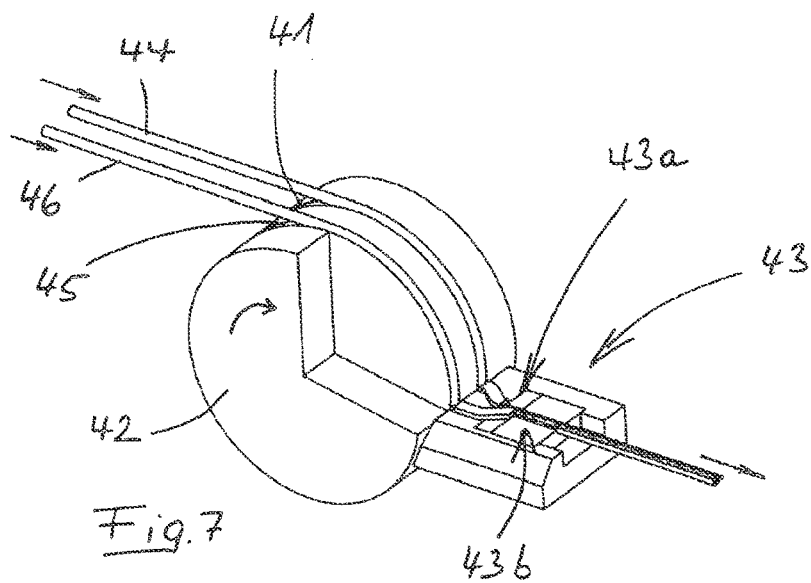
FIG. 7 shows the production of a basic profile destined for further processing as a drum-commutator lamella, in the form of a two-component extrusion profile by application of the Conform process.
Figure 8:
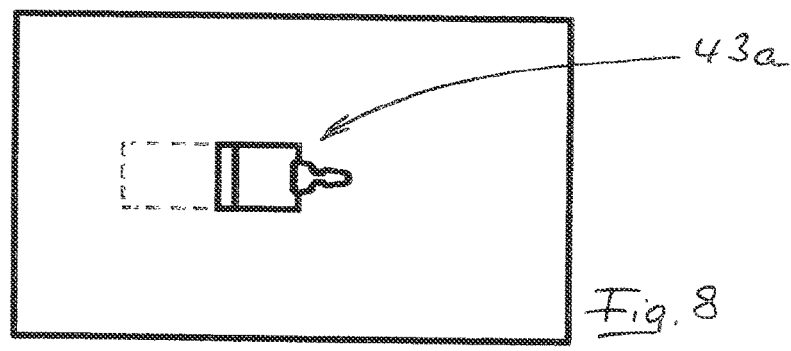
FIG. 8 shows a vertical section through the extrusion nozzle used according to FIG. 7.

Merely for completeness it must be pointed out that a symmetric two-component three-zone extrusion profile, which subsequently will be halved into two identical two-component lamella basic profiles, can also be produced by application of the Conform process (FIG. 7). In this case, a Conform machine with a three-groove feed wheel is applied, wherein one strand of the first material is fed to the common extrusion nozzle via the middle feed groove of the feed wheel common extrusion nozzle and two strands of the second material are fed via the two lateral feed grooves.

Figure 15:
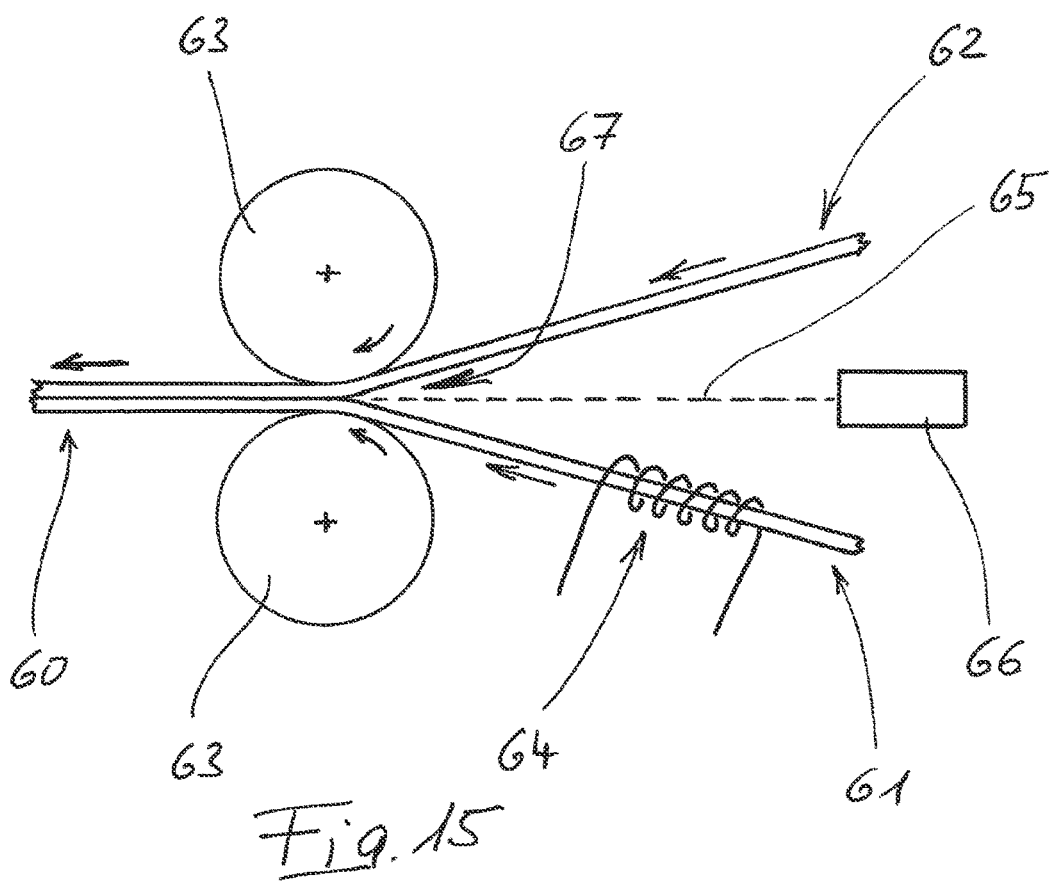
FIG. 15 shows another process variant for producing a strand-like two-component profile, from which conductor segments or conductor-segment blanks can be punched out.

FIG. 15 illustrates an alternative way of producing a strand-like two-component profile 60, which is suitable for stamping out conductor segments 10 therefrom, for example corresponding to FIGS. 2 and 3 or else conductor-segment blanks 58, as can be used for the production of conductor segments according to FIG. 5a. And, in fact, a copper sub-profile 61 and an aluminum sub-profile 62 are rolled together continuously under high pressure (between two rotating rolls 63), wherein on the one hand copper sub-profile 61 is preheated by means of inductive heating (see induction heater 64) before being joined to aluminum sub-profile 62 and on the other hand a laser beam 65 (see laser unit 66) is directed straight into joint zone 67 between the two sub-profiles. In two-component profile 60 produced in this way, the joint between aluminum sub-profile 62 and copper sub-profile 61 has sufficient capacity to withstand mechanical and electrical loads.

What is claimed is:

1. A rotor (4) of a dynamoelectric machine comprising a shaft (5), a cylindrical armature (6), an armature winding (7) and a drum commutator (8), which comprises an insulating support member (9) and conductor segments (10), which are attached thereto and anchored in the support member (9) by means of armature portions (17), and to which the winding wires (11) are attached in electrically conducting relationship, wherein:

- the winding wires (11) consist of aluminum;
- the conductor segments (10) respectively have a running-surface region (18) consisting of copper and a terminal region (21) consisting of aluminum or a metal that can be welded to aluminum (aluminum-compatible metal);
- the armature portions (17) consist completely of copper and are respectively part of a uniform copper structure (19) that also comprises the respective associated running-surface region (18);
- the terminal region (21) comprises respectively a massive terminal lug (20), which projects radially relative to the brush running surface;
- the conductor segments (10) are stamped out of a strand-like two-component profile (60), which was formed by durably joining a copper sub-profile (61) and an aluminum sub-profile (62);
- the winding wires (11) are welded at the end to the terminal lug (20) of the respectively associated conductor segment (10), without being in direct contact with the running-surface regions (18); and
- the terminal lugs (20) each respectively have a recess for receiving the end of at least one winding wire (11).

2. The rotor of claim 1, wherein the conductor segments (10) with a transition zone from copper to aluminum-compatible metal parallel to the commutator axis respectively contain a two-component extrusion profile.

3. The rotor of claim 2, wherein the two-component extrusion profile is a co-extrusion profile, which is produced by simultaneous extrusion of copper and aluminum-compatible metal through a common nozzle (43).

4. The rotor of claim 2, wherein the two-component extrusion profile is produced by extruding aluminum-compatible metal onto a copper basic profile (48).

5. The rotor of claim 4, wherein after extrusion of aluminum-compatible metal onto the copper basic profile (48), mechanical post-processing of the transition zone is carried out.

6. The rotor of claim 1, wherein the two-component extrusion profile is produced from a symmetric three-zone extrusion profile (52) by halving.

7. The rotor of claim 1, wherein the end of at least one winding wire (11) is welded directly to a radial outer face, which is not provided with any recess, of the terminal lug (20) in question.

* * * * *